(12) United States Patent
Otsuka et al.

(10) Patent No.: US 10,611,224 B2
(45) Date of Patent: Apr. 7, 2020

(54) AUTOMOTIVE GLASS RUN

(71) Applicant: TOYODA GOSEI CO., LTD., Kiyosu-shi, Aichi-ken (JP)

(72) Inventors: Hirofumi Otsuka, Kiyosu (JP); Hiroshi Sugawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/254,701

(22) Filed: Jan. 23, 2019

(65) Prior Publication Data
US 2019/0232772 A1  Aug. 1, 2019

(30) Foreign Application Priority Data
Jan. 30, 2018 (JP) .................................. 2018-013204

(51) Int. Cl.
| | |
|---|---|
| *E05D 15/16* | (2006.01) |
| *B60J 10/76* | (2016.01) |
| *B60J 10/16* | (2016.01) |
| *B60J 10/15* | (2016.01) |
| *B60J 10/277* | (2016.01) |

(52) U.S. Cl.
CPC .............. *B60J 10/76* (2016.02); *B60J 10/15* (2016.02); *B60J 10/16* (2016.02); *B60J 10/277* (2016.02)

(58) Field of Classification Search
CPC ........... B60J 10/76; B60J 10/277; B60J 10/15
USPC .................................................. 49/440, 441
See application file for complete search history.

(56) References Cited

U.S. PATENT DOCUMENTS

| | | | | |
|---|---|---|---|---|
| 2,847,247 A | * | 8/1958 | Kramer | B60J 10/17 49/440 |
| 4,894,289 A | * | 1/1990 | Otawa | B60J 10/17 428/424.2 |
| 5,183,613 A | * | 2/1993 | Edwards | C08J 5/12 264/173.19 |
| 5,414,961 A | * | 5/1995 | Tessier | B60J 10/16 49/441 |
| 5,667,902 A | * | 9/1997 | Brew | B32B 27/32 428/518 |
| 8,297,681 B2 | * | 10/2012 | Sato | B60J 1/08 296/146.2 |
| 8,327,584 B2 | * | 12/2012 | Goto | B60J 10/76 49/441 |

(Continued)

FOREIGN PATENT DOCUMENTS

| | | |
|---|---|---|
| JP | 2005-349869 A | 12/2005 |
| JP | 2011-225205 A | 11/2011 |

*Primary Examiner* — Jerry E Redman
(74) *Attorney, Agent, or Firm* — Posz Law Firm, PLC (57) ABSTRACT

An automotive glass run that is attached to an inner periphery of a door frame of an automotive door, guides ascending and descending of a door glass, and is formed of a thermoplastic elastomer, includes: a main body having a substantially U-shaped cross section, the main body including a vehicle-exterior side wall, a vehicle-interior side wall, and a bottom wall; a holding lip that extends from at least one of the vehicle-exterior side wall and the vehicle-interior side wall and abuts on the door frame; and a plasticizer rich layer formed on at least one side of the holding lip abutting on the door frame, the plasticizer rich layer including a large amount of plasticizer component compared to the thermoplastic elastomer forming the holding lip.

10 Claims, 4 Drawing Sheets

(56) References Cited

U.S. PATENT DOCUMENTS

| | | | | |
|---|---|---|---|---|
| 8,869,457 | B2* | 10/2014 | Masumoto | B60J 10/24 49/495.1 |
| 9,845,000 | B2* | 12/2017 | Kojima | B60J 10/76 |
| 2002/0032284 | A1* | 3/2002 | Jourdain | B32B 27/08 525/285 |
| 2003/0017302 | A1* | 1/2003 | Drozd | B32B 15/08 428/122 |
| 2003/0065102 | A1* | 4/2003 | Jourdain | B32B 27/08 525/327.4 |
| 2004/0182036 | A1* | 9/2004 | Sjoberg | E04F 15/02 52/592.1 |
| 2006/0064936 | A1* | 3/2006 | Shiraiwa | B60J 10/16 49/441 |
| 2006/0248802 | A1* | 11/2006 | Tamaoki | B60J 10/16 49/441 |
| 2011/0308170 | A1* | 12/2011 | Goto | B60J 10/265 49/489.1 |
| 2012/0055576 | A1* | 3/2012 | Prusty | C08L 75/04 138/177 |
| 2012/0319575 | A1* | 12/2012 | Nakamura | H01L 33/505 313/512 |
| 2015/0047264 | A1* | 2/2015 | Kobayashi | E06B 7/2303 49/440 |
| 2015/0184014 | A1* | 7/2015 | Nakahara | C08J 7/047 428/424.2 |
| 2019/0185660 | A1* | 6/2019 | Kawamura | B32B 27/36 |
| 2019/0232770 | A1* | 8/2019 | Otsuka | B60J 10/277 |

* cited by examiner

AUTOMOTIVE GLASS RUN

CROSS-REFERENCE TO RELATED APPLICATION(S)

This application is based upon and claims the benefit of priority from Japanese Patent Application No. 2018-013204, filed on Jan. 30, 2018, the entire contents of which are incorporated herein by reference.

BACKGROUND

1. Field of the Invention

The present invention relates to a glass run that is attached to an inner periphery of a door frame of an automotive door and guides ascending and descending operations of door glass.

2. Description of the Related Art

Figure 4:
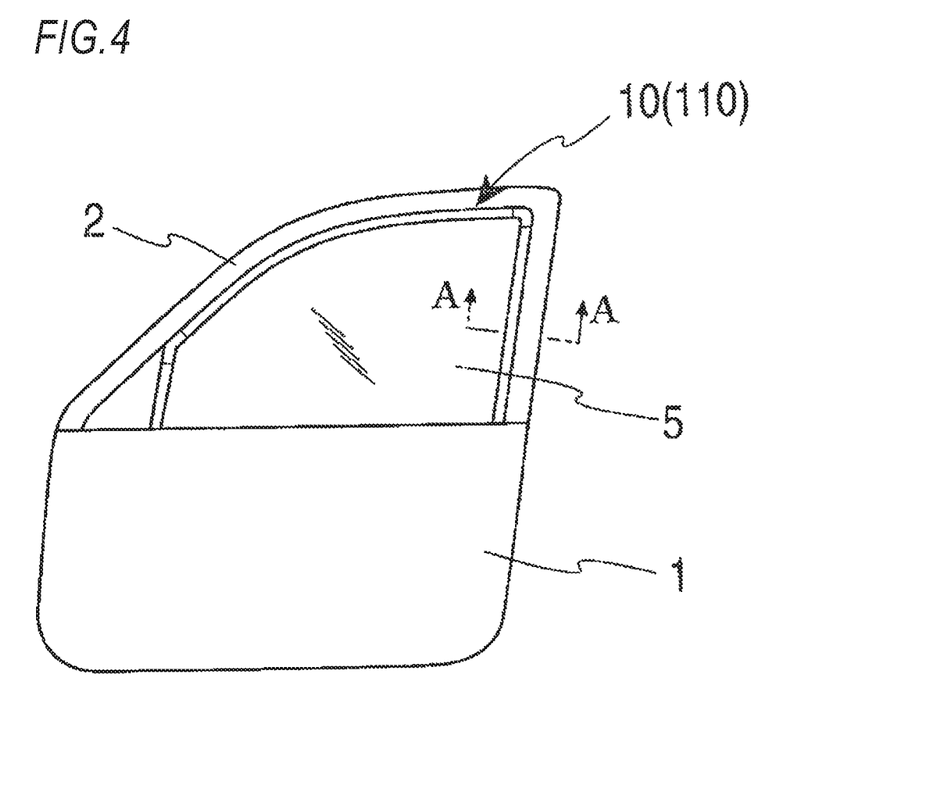
FIG. 4 is a front view of an automotive door (front)
Figure 5A:
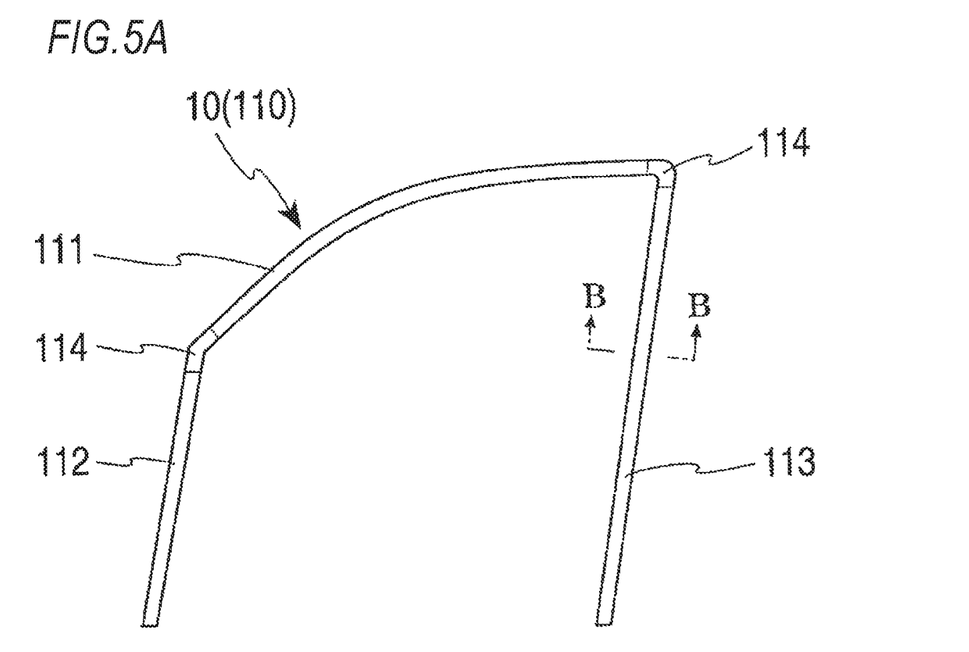
FIG. 5A is a front view of a glass run.
Figure 5B:
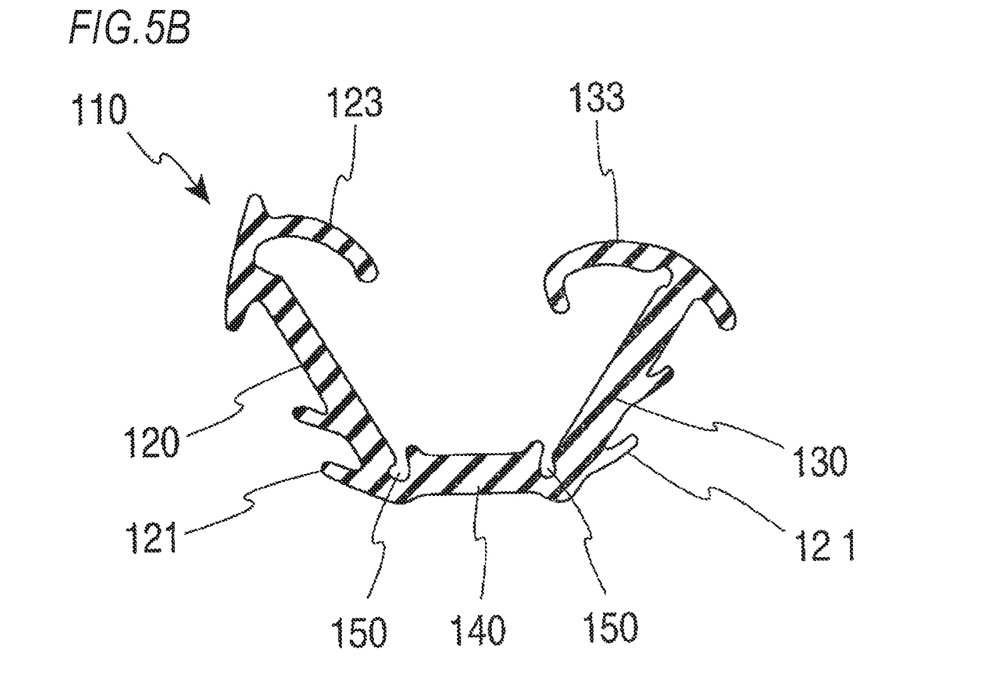
FIG. 5B is a cross-sectional view taken along the arrow line B-B in FIG. 5A.
Figure 6:
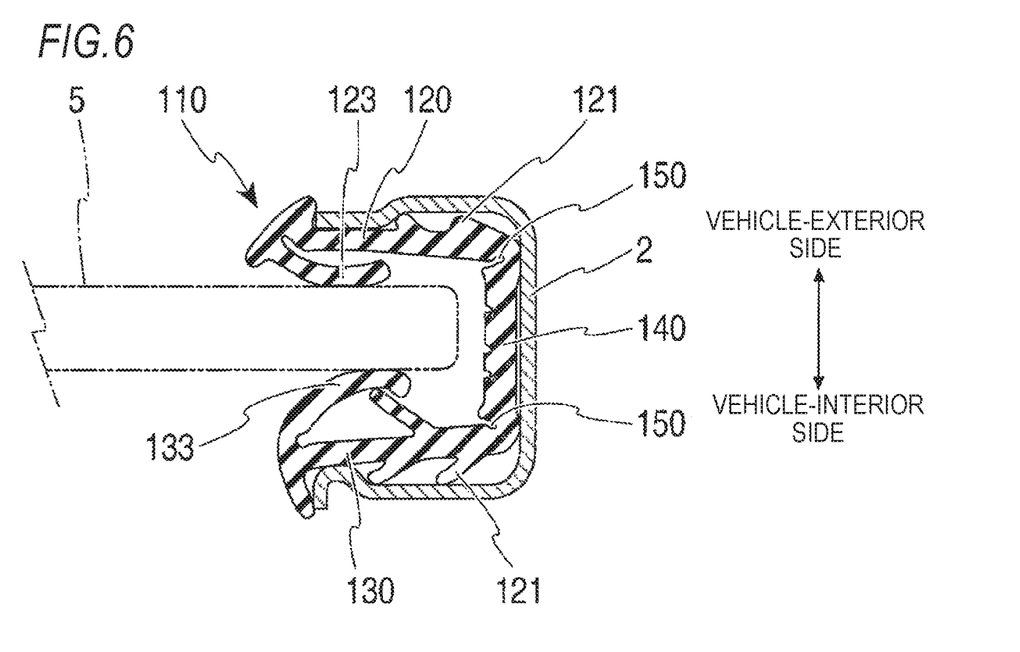
FIG. 6 is a cross-sectional view in a state in which a related-art glass run is assembled to a door frame and is a cross-sectional view taken along the arrow line A-A in FIG. 4.

As illustrated in FIG. 4, a glass run 110 for guiding ascending and descending operations of a door glass 5 is attached to an inner periphery of a door frame 2 of an automotive door 1. The entirety of the related-art glass run 110 is illustrated in FIG. 5A and a cross-sectional view of the glass run 110 before being attached to the door frame 2 is illustrated in FIG. 5B. FIG. 6 is a cross-sectional view taken along the arrow line A-A in FIG. 4 in a state in which the related-art glass run 10 is attached to the door frame 2.

Conventionally, the glass run 110 is attached to the inside of a channel of the door frame 2 as illustrated in FIG. 4 to guide ascending and descending of the door glass 5 and seal a space between the door glass 5 and the door frame 2. Further, as illustrated in FIG. 5A, the glass run 110 includes a glass run upper side portion 111 attached to the upper side portion of the door frame 2, a glass run rear vertical side portion 113 attached to the rear vertical side portion of the door frame 2, a glass run front side vertical side portion 112 attached to the front vertical side portion of the door frame 2, and corner portions 114 connecting the glass run upper side portion, the glass run rear side vertical side portion and the glass run front side vertical side portion. The glass run rear vertical side portion 113, the glass run upper side portion 111, and the glass run front side vertical side portion 112 are molded by extrusion molding, and the corner portions 114 are molded by die molding.

As illustrated in FIG. 5B, the glass run 110 is molded in an open state before the glass run is assembled to the door frame 2. A seal between the door and a vehicle body is formed with a door weatherstrip (not illustrated) attached to an outer periphery of a door panel and the outer periphery of the door frame 2 and/or an opening trim weather strip (not illustrated) attached to flanges of openings of the vehicle body.

As illustrated in FIG. 5B, the glass run 110 is formed in a substantially U-shaped cross-sectional shape and includes a vehicle-exterior side wall 120, a vehicle-interior side wall 130, and a bottom wall 140, recesses 150 are formed in connection portions connecting the bottom wall 140 and the vehicle-exterior side wall 120, and the bottom wall 140 and the vehicle-interior side wall 130, and the vehicle-exterior side wall 120 and the vehicle-interior side wall 130 are bent to the inside to facilitate assembly to the door frame 2. A vehicle-exterior seal lip 123 is provided so as to extend from the vicinity of the leading end of the vehicle-exterior side wall 120 toward an inside of the substantially U-shaped cross section of a main body. Further, a vehicle-interior seal lip 133 is also provided on the vehicle-interior side wall 130 so as to extend from the vicinity of the leading end of the vehicle-interior side wall toward the inside of the substantially U-shaped cross section. The vehicle-exterior side wall 120 and the vehicle-interior side wall 130 of the glass run 110 are inserted into a channel formed in the door frame 2 so as to be bent inwardly around the recesses 150, and a holding lip 121 formed on the outer surface of each wall abuts and is engaged with the inner surface of the channel provided in the door frame 2 so that the glass run 110 is held in the channel provided in the door frame 2 (for example, see JP-A-2005-349869).

The glass run 110 has been conventionally manufactured using vulcanized rubber such as EPDM, but in consideration of properties close to rubber, a specific gravity lighter than that of a rubber compound, ease of molding, recycling and the like, products formed using a thermoplastic elastomer (TPE) have been widespread in recent years. Even in a case of using a thermoplastic elastomer, there is no special change in the configuration of the glass run 110, and the glass run 110 is basically configured to include the main body having a substantially U-shaped cross-sectional shape and including the vehicle-exterior side wall 120, the vehicle-interior side wall 130, and the bottom wall 140, the holding lip 121 formed on the outer surface of each wall, and the vehicle-exterior seal lip 123 and the vehicle-interior seal lip 133 formed at the leading end of each wall as described above. As illustrated in FIG. 6, the vehicle-exterior side wall 120 and the vehicle-interior side wall 130 are bent inwardly around the recesses 150 to be assembled to the door frame 2, the holding lips 121 formed on the outer surfaces of the vehicle-exterior side wall 120 and the vehicle-interior side wall 130 abut and are engaged with the inner surface the door frame 2, and a restoring force acts on the holding lip 121 to prevent a position shift of the vehicle-exterior side wall 120 and the vehicle-interior side wall 130, and the door frame 2 (for example, see JP-A-2011-225205).

However, in a case of the glass run 110 formed by using a thermoplastic elastomer, when the time has elapsed in the deformed state in which the glass run is assembled to the door frame 2, a phenomenon of permanent deformation (compression set) occurs. As a result, the restoring force toward the door frame 2 acting on the holding lip 121 decreases, and a holding force and an anti-shift force between the holding lip 121 and the door frame 2 decrease, thereby causing a problem of a position shift.

SUMMARY

An object of the invention is to provide an automotive glass run capable of, when attaching a glass run to a door frame, having initial performance such as good workability and good holding at the time of attachment, maintaining the holding force between the glass run and the door frame over time after attachment, and maintaining sufficient durability.

According to a first aspect of the invention, there is provided an automotive glass run that is attached to an inner periphery of a door frame of an automotive door, guides ascending and descending of a door glass, and is formed of a thermoplastic elastomer, including: a main body having a substantially U-shaped cross section, the main body including a vehicle-exterior side wall, a vehicle-interior side wall, and a bottom wall; a holding lip that extends from at least one of the vehicle-exterior side wall and the vehicle-interior side wall and abuts on the door frame; and a plasticizer rich layer formed on at least one side of the holding lip abutting on the door frame, the plasticizer rich layer including a large amount of plasticizer component compared to the thermoplastic elastomer forming the holding lip.

The plasticizer component in the invention is process oil contained in the thermoplastic elastomer.

Here, there are roughly three kinds of process oils: paraffin-based process oil; naphthenic-based process oil; and aromatic process oil, and in the invention, any process oil can be used alone or in combination.

According to the first aspect of the invention, the glass run main body is formed in a substantially U-shaped cross-sectional shape and includes the vehicle-exterior side wall, the bottom wall, and the vehicle-interior side wall, the holding lip extending in the door frame direction is provided on at least one of the vehicle-exterior side wall and the vehicle-interior side wall, and when the vehicle-exterior side wall and the vehicle-interior side wall are bent inwardly to be assembled to the door frame, a restoring force toward the door frame acts on holding lips by causing the holding lips to abut on the door frame, so that the glass run is reliably fixed in the door frame.

Since the plasticizer rich layer containing a large amount of plasticizer component compared to the thermoplastic elastomer forming the holding lip is formed on at least one side of the holding lip abutting on the door frame, in the holding lip, a phenomenon occurs in which the plasticizer component moves from the plasticizer rich layer of a high concentration to the holding lip of a low concentration in with the passage of time, a shrinkage force is generated in the plasticizer rich layer where the concentration of the plasticizer component is decreased, and an expansion force is generated in the holding lip where the concentration of the plasticizer component is increased. As a result, even when the holding force of the holding lip is decreased due to compression set, the holding force of the glass run and the door frame is maintained by the warpage of the holding lip to the door frame, and thus it is possible to prevent a position shift of the glass run in the door frame.

According to a second aspect of the invention, in the glass run main body according to the first aspect, the plasticizer rich layer may be formed on a side of the bottom wall abutting on the door frame in addition to the holding lip.

According to the second aspect of the invention, since the plasticizer rich layer is also formed on the side of the bottom wall abutting on the door frame in addition to the holding lip, in the bottom wall, with the passage of time, the plasticizer component moves from the plasticizer rich layer side having a high concentration to the bottom wall side having a low concentration, the shrinkage force generated in the plasticizer rich layer where the concentration of the plasticizer component is decreased, and the expansion force generated in the bottom wall where the concentration of the plasticizer component is increased are generated. As a result, even when a deforming (warping) force toward the door frame is generated in the bottom wall as well, and the holding force of the holding lip is decreased due to compression set, it is possible to prevent a position shift of the glass run in the door frame due to the warpage of the holding lip.

According to a third aspect of the invention, in the glass run main body according to the first aspect, the plasticizer rich layer may be continuously formed along a side of the bottom wall and the holding lip abutting on the door frame.

According to the third aspect of the invention, the plasticizer rich layer is continuously formed along a side of the bottom wall and the holding lip abutting on the door frame. Therefore, with the passage of time, the plasticizer component moves from a high concentration side to a low concentration side, the shrinkage force generated in the plasticizer rich layer where the concentration of the plasticizer component is decreased, and the expansion force generated in the member where the concentration of the plasticizer component is increased are generated in the holding lip and the bottom wall together. Even when a deforming (warping) force toward the door frame is generated in the main body including the vehicle-exterior side wall, the vehicle-interior side wall, and the bottom wall, and as a result the holding force of the holding lip is decreased due to compression set, it is possible to prevent a position shift of the glass run in the door frame.

According to a fourth aspect of the invention, in the glass run main body according to any one of the first to third aspects, the plasticizer rich layer may be continuously formed along a side of the bottom wall and the holding lip abutting on the door frame.

According to the fourth aspect of the invention, since the difference in weight fraction of the plasticizer component of the plasticizer rich layer with the plasticizer component contained in the thermoplastic elastomer forming the holding lip and the bottom wall is from 3% to 25%, it is possible to obtain initial performance such as good workability and good holding force at the time of assembling when the glass run is assembled to the door frame, to maintain the holding force of the holding lip, the vehicle-exterior side wall, and the vehicle-interior side wall with respect to the door frame over time even after assembling, and to maintain sufficient durability.

According to a fifth aspect of the invention, in the glass run main body according to any one of the first to fourth aspects, the thermoplastic elastomer is a dynamic vulcanization thermoplastic elastomer or a styrene-based thermoplastic elastomer.

According to the fifth aspect of the invention, since the automotive glass run is formed by using, as the thermoplastic elastomer, a dynamic vulcanization thermoplastic elastomer (TPV) or a styrene-based thermoplastic elastomer (TPS), it is possible to obtain excellent mechanical strength and weather resistance and improve the durability of the glass run.

In the glass run formed by using the thermoplastic elastomer, since the plasticizer rich layer containing a large amount of plasticizer component is continuously formed on the side of the holding lip close to the door frame, the side of the holding lip close to the door frame and the bottom wall, or the bottom wall and the holding lip, even when the holding force of the holding lip is decreased due to compression set, the holding force and anti-shift force of the glass run to the door frame are maintained to improve product quality. In the invention, the above effect is exhibited with the passage of time, and thus there is no influence on workability when the glass run is assembled to the door frame, and the initial performance such as good holding force at the time of assembling.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

The invention relates to an automotive glass run capable of maintaining the holding force of the glass run and a door frame over time even after the glass run is assembled to the door frame and maintaining sufficient durability by providing a plasticizer rich layer containing a large amount of plasticizer component on a side close to the door frame such as a holding lip or a bottom wall in the glass run.

The positional relationships between the automotive door and the door frame, and the door frame and the glass run, the connection of the glass run front vertical side portion, the glass run upper side portion, and the glass run rear vertical side portion formed by extrusion molding by corner portions formed by die molding in the glass run, the molding of the glass run as the open state in advance, and members configuring the glass run, such as a vehicle-interior side wall, a vehicle-exterior side wall, and a bottom wall, are as described in the section of the related art using FIGS. 4 to 6.

Figure 1:
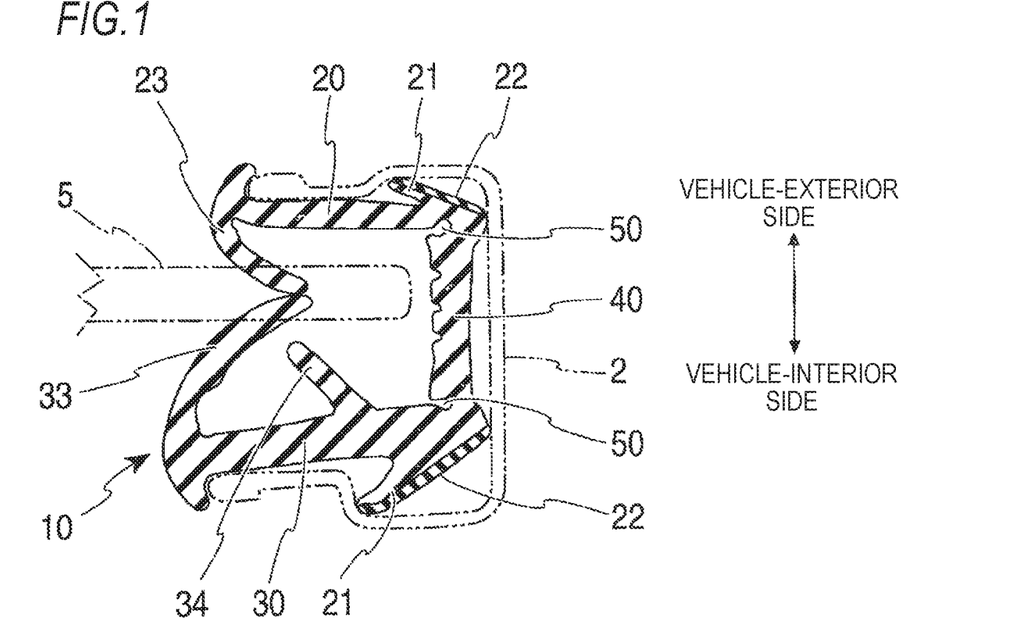
FIG. 1 is a cross-sectional view illustrating a state in which a glass run of a first embodiment of the invention is assembled to the rear vertical side portion of a door frame, and is a cross-sectional view taken along the arrow line A-A in FIG. 4.

FIG. 1 illustrates a first embodiment of the invention and is a cross-sectional view taken along the arrow line A-A in FIG. 4 in a state in which a glass run 10 is assembled to a door frame 2. The glass run 10 includes a main body having a substantially U-shaped cross-sectional shape and including a vehicle-exterior side wall 20, a vehicle-interior side wall 30, and a bottom wall 40, and recesses 50 are formed in portions where the bottom wall 40 and the vehicle-exterior side wall 20 are connected, and the bottom wall 40 and the vehicle-interior side wall 30 are connected. Holding lips 21 are formed on the sides of the vehicle-exterior side wall 20 and the vehicle-interior side wall 30 abutting on the door frame 2, and further, plasticizer rich layers 22 containing a large amount of plasticizer component compared to a plasticizer component contained in the holding lip 21 are formed on the sides of the holding lips 21 abutting on the door frame 2. The vehicle-exterior side wall 20 and the vehicle-interior side wall 30 of the glass run 10 are inserted into the door frame 2 so as to be bent inwardly around the recesses 50, and the plasticizer rich layers 22 formed on the holding lip 21 abut and are engaged with the inner surface of the door frame 2 so that the glass run 10 is held in the door frame 2.

A vehicle-exterior seal lip 23 is provided so as to extend from the vicinity of the leading end of the vehicle-exterior side wall 20 toward the inside of the substantially U-shaped cross section, and a vehicle-interior seal lip 33 is also provided on the vehicle-interior side wall 30 so as to extend from the vicinity of the leading end of the vehicle-interior side wall toward the inside of the substantially U-shaped cross section. Since the vehicle-exterior seal lip 23 and the vehicle-interior seal lip 33 abut on both side surfaces of door glass 5, the vehicle-exterior seal lip 23 and the vehicle-interior seal lip 33 can guide ascending and descending of the door glass 5 and seal a space between the glass run 10 and the door glass 5.

A vehicle-interior projection lip 34 abutting on the inside of the vehicle-interior seal lip 33 is formed on the inside of the vehicle-interior side wall 30. By the vehicle-interior projection lip 34, when the door glass 5 is greatly displaced to the vehicle-interior side in the main body, close contact of the vehicle-interior seal lip 33 with the vehicle-interior side wall 30 is prevented so that generation of an unusual sound can be prevented and the side end of the door glass 5 can be held. In addition, the door glass 5 can be located on the vehicle-exterior side.

In the embodiment, the glass run 10 is molded by single extrusion molding including the plasticizer rich layer 22 using a dynamic vulcanization thermoplastic elastomer (TPV) as a thermoplastic elastomer. A difference in weight fraction of the plasticizer component with the plasticizer contained in the thermoplastic elastomer forming the holding lip 21 of the plasticizer rich layer 22 is 12%. In addition, the thickness of the plasticizer rich layer 22 is 0.6 mm.

In FIG. 1, since the plasticizer rich layer 22 containing a large amount of plasticizer component compared to the plasticizer component contained in the holding lip 21 and the vehicle is formed on the side of the holding lip 21 abutting on the door frame 2, a phenomenon occurs in which the plasticizer component moves from a high concentration side to a low concentration side, that is, from the plasticizer rich layer 22 to the holding lip 21 with the passage of time. Thus, a shrinkage force is generated in the plasticizer rich layer 22 where the concentration of the plasticizer component is decreased, and an expansion force is generated in the holding lip 21 where the concentration of the plasticizer component is increased.

As a result, the holding lip 21 is warped so as to fall down toward the door frame 2, and the close contact force between the holding lip 21 and the door frame 2 is increased. Therefore, even when the holding force of the holding lip 21 is decreased due to compression set, it is possible to prevent a position shift of the glass run 10 in the door frame 2.

In the first embodiment, although the plasticizer rich layer 22 is formed on the holding lips 21 on both the vehicle-interior side and the vehicle-exterior side, due to the same effect even in a case where the plasticizer rich layer is formed on only one side, even when the holding force of the holding lip 21 is decreased by compression set, it is possible to prevent the position shift of the glass run 10 in the door frame 2.

Figure 2:
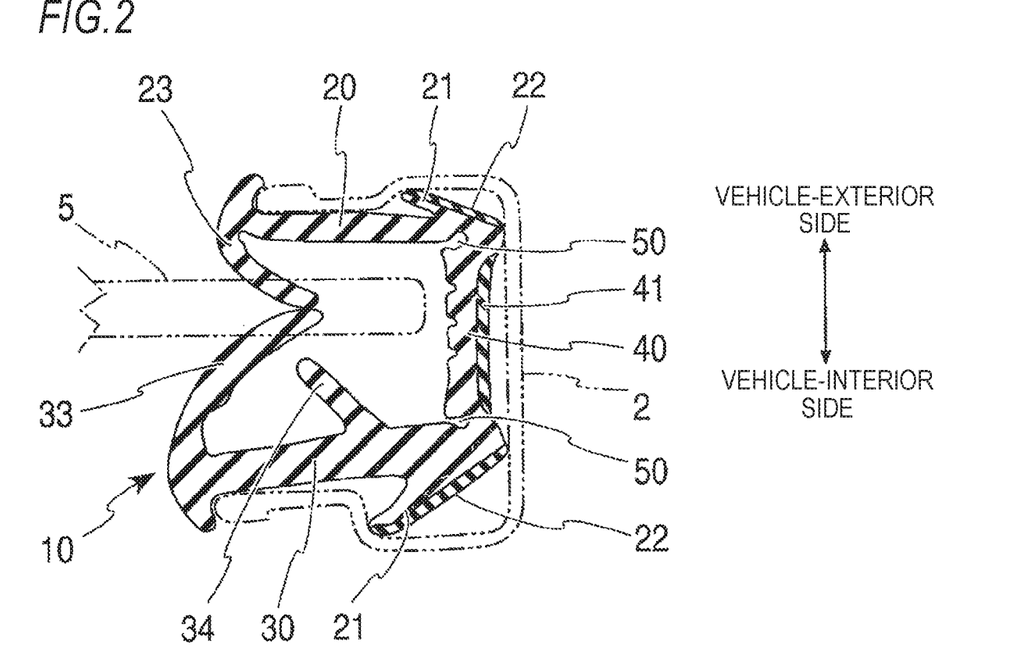
FIG. 2 is a cross-sectional view illustrating a state in which a glass run of a second embodiment of the invention is assembled to the rear vertical side portion of a door frame, and is a cross-sectional view taken along the arrow line A-A in FIG. 4.

FIG. 2 illustrates a second embodiment to the invention and is a cross-sectional view taken along the arrow line A-A in FIG. 4 in a state in which the glass run 10 is assembled to the door frame 2. The difference between the second embodiment and the first embodiment described above is that in the second embodiment, regarding the plasticizer rich layer, a plasticizer rich layer 41 is formed not only in the holding lip 21 but also in the bottom wall 40. Regarding the plasticizer rich layer 41, a difference in weight fraction of the plasticizer component in the plasticizer rich layer with the plasticizer contained in the thermoplastic elastomer forming the bottom wall 40 is 12% as in the plasticizer rich layer 22. In addition, the thickness of the plasticizer rich layer 41 is 0.6 mm like the plasticizer rich layer 22.

In FIG. 2, since the plasticizer rich layers 22 and the plasticizer rich layer 41 are formed on the side of the holding lips 21 and the bottom wall 40 close to the door frame 2, the plasticizer component also moves from a high concentration side to a low concentration side in the bottom wall 40 with the passage of time, a shrinkage force is generated in the plasticizer rich layer 41 where the concentration of the plasticizer component is decreased, and an expansion force is generated in the bottom wall 40 where the concentration of the plasticizer component is increased. As a result, even when a warping force is generated by shrinkage of the side of the bottom wall 40 close to the door frame 2 and the holding force of the holding lip 21 is decreased by compression set, it is possible to prevent a position shift of the glass run 10 in the door frame 2 due to the warpage of the holding lip 21 having the plasticizer rich layer 22.

In the second embodiment, although the plasticizer rich layer 22 is formed on the holding lips 21 on both the vehicle-interior side and the vehicle-exterior side, the plasticizer rich layer may be formed on only one side. Even in this case, by the same effect, even when the holding force of the holding lip 21 is decreased due to compression set, due to the warpage of the holding lip 21 having the plasticizer rich layer 22 and the warpage of the bottom wall 40 having the plasticizer rich layer 41, it is possible to prevent a position shift of the glass run 10 in the door frame 2.

Figure 3:
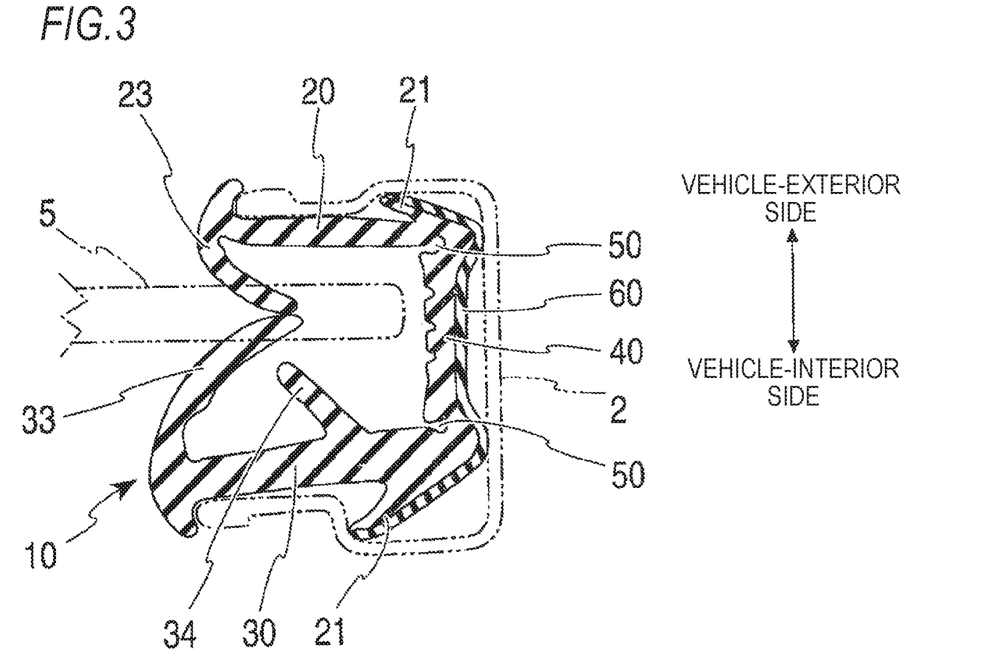
FIG. 3 is a cross-sectional view illustrating a state in which a glass run of a third embodiment of the invention is assembled to the rear vertical side portion of a door frame, and is a cross-sectional view taken along the arrow line A-A in FIG. 4.

FIG. 3 illustrates a third embodiment of the invention and is a cross-sectional view taken along the arrow line A-A in FIG. 4 in a state in which the glass run 10 is assembled to the door frame 2. The difference between the third embodiment and the first and second embodiments described above is that in the third embodiment, a plasticizer rich layer 60 is continuously formed along the side of the holding lips 21 and the bottom wall 40 close to the door frame 2. A difference in weight fraction of the plasticizer component in the plasticizer rich layer 60 with the plasticizer contained in the thermoplastic elastomer forming the holding lips 21 and the bottom wall 40 is 23%. In addition, the thickness of the plasticizer rich layer 60 is 0.6 mm.

In FIG. 3, since the plasticizer rich layer 60 is continuously formed along the side of the holding lips 21 and the bottom wall 40 close to the door frame 2, the plasticizer component moves from a high concentration side to a low concentration side with the passage of time, a shrinkage force is generated in the plasticizer rich layer 60 where the concentration of the plasticizer component is decreased, and an expansion force is generated in the holding lip 21 and the bottom wall 40 where the concentration of the plasticizer component is increased. This phenomenon occurs in the holding lip 21 and the bottom wall 40 together, and even when the holding force of the holding lip 21 is decreased due to compression set, it is possible to prevent a position shift of the glass run 10 in the door frame 2.

In the third embodiment, although the plasticizer rich layer 60 is formed on the holding lips 21 on both the vehicle-interior side and the vehicle-exterior side, the plasticizer rich layer may be formed on only one side, that is, may be continuously formed from the holding lip 21 of the vehicle-interior side to the bottom wall 40, or may be continuously formed from the bottom wall 40 to the holding lip 21 of the vehicle-exterior side. Even in this case, by the same effect, even when the holding force of the holding lip 21 is decreased due to compression set, it is possible to prevent a position shift of the glass run 10 in the door frame 2.

(Verification of Effect)

The phenomenon accompanying the formation of the plasticizer rich layer, that is, the movement of the plasticizer component from a high concentration side to a low concentration side with the passage of time, the generation of the shrinkage force in the plasticizer rich layer where the concentration of the plasticizer component is decreased, the generation of the expansion force in a layer (hereinafter referred to as "base material") in contact with the plasticizer rich layer where the concentration of the plasticizer component is increased, and as a result, the occurrence of warpage in which the base material side is expanded were verified as follows.

The difference in weight fraction of the plasticizer component of the plasticizer rich layer is 12% in the first and second embodiments. Test pieces prepared has a size of a width of 40 mm and a length of 20 mm and is a rectangular solid with a total of 1.2 mm of a base material thickness of 0.6 mm and a plasticizer rich layer thickness of 0.6 mm in the thickness direction, and the number of test pieces is 3. The weight fraction of the plasticizer component contained in the base material is 33% by weight.

The results of measuring the amount of warpage when the above test pieces are placed in an atmosphere at 80° C. are shown in Table 1. The test piece was placed such while disposing the base material on the upper side and disposing the plasticizer rich layer on the lower side, and the amount of deformation was measured with a profile projector with the lower surface of the plasticizer rich layer as the reference surface. The deformation (warpage) occurred when the base material side expanded.

TABLE 1

Measurement results of amount of warpage (mm) (80° C., average value of n = 3)

| | Test time (hour) | | | | | |
|---|---|---|---|---|---|---|
| | 0 | 24 | 48 | 200 | 720 | 1200 |
| Amount of warpage (mm) | 0 | 2.4 | 3.5 | 3.6 | 3.6 | 3.6 |

The difference in weight fraction of the plasticizer component of the plasticizer rich layer was 12% and 23% in the examples and verification. The difference is preferably in a range of 3% to 25%. In a case where the difference in weight fraction of the plasticizer component of the plasticizer rich layer is small, the amount of warpage is small, and the effect thereof is small. In addition, when the concentration of the plasticizer component is increased, the plasticizer component rich layer itself becomes flexible and surface roughness is also generated. When the difference in weight fraction of the plasticizer component is more than 25%, the amount of warpage is excessive, the entire holding lip is greatly deformed and does not normally abut on the door frame. Thus, it is not possible to maintain the initial performance such as good holding force.

The weight fraction of the plasticizer component contained in the base material was 33% by weight in the above verification. The weight fraction is preferably in a range of 27% by weight to 50% by weight. In addition, the weight fraction of the plasticizer component contained in the plasticizer rich layer is preferably in a range of 30% by weight to 65% by weight. Within the range above, the effect of the present invention can be sufficiently confirmed.

The thickness of the plasticizer rich layer is preferably a thickness in a range of ⅓ to 2 times the thickness of the base material. A case where the thickness of the plasticizer rich layer is 1 time the thickness of the base material, that is, the thickness of the plasticizer rich layer is equal to the thickness of the base material, is more preferable. Incidentally, in the above verification experiment, the thickness of the plasticizer rich layer is 0.6 mm, the thickness of the base material is 0.6 mm, and the thickness of the plasticizer rich layer is 1 time the thickness of the base material.

In the first to third embodiments, a case of using a dynamic vulcanization type thermoplastic elastomer (TPV) as a thermoplastic elastomer to be used was verified. However, the same effect can be obtained in a case of using a styrene type thermoplastic elastomer (TPS).

The implementation of the present invention is not limited to the above embodiments, and various modifications can be made without departing from the object of the present invention.

For example, in the first to third embodiments, the plasticizer rich layer 22 and the plasticizer rich layer 60 are present up to the leading end of the holding lip 21 and abut and are engaged with the door frame 2. However, the door frame 2 may abut on the holding lip 21, and the plasticizer rich layer 22 and the plasticizer rich layer 60 may be provided in portions of the holding lip 21 other than the abutting and engaged portion.

Further, for example, the difference in weight fraction of the plasticizer component of the plasticizer rich layer and the thickness thereof are not the same or uniform in the holding lip 21 and the bottom wall 40 and may be partially changed as long as the difference and the thickness are in the ranges based on the idea concerning the difference in increase rate of weight fraction of the plasticizer component and the thickness.

What is claimed is:

1. An automotive glass run that is attached to an inner periphery of a door frame of an automotive door, guides ascending and descending of a door glass, and is formed of a thermoplastic elastomer, comprising:
    a main body having a substantially U-shaped cross section, the main body including a vehicle-exterior side wall, a vehicle-interior side wall, and a bottom wall;
    a holding lip that extends from at least one of the vehicle-exterior side wall and the vehicle-interior side wall and abuts on the door frame; and
    a plasticizer-enriched thermoplastic elastomer layer formed on at least one side of the holding lip abutting on the door frame, the thermoplastic elastomer of the plasticizer-enriched thermoplastic elastomer layer containing a higher concentration of the plasticizer component compared to the thermoplastic elastomer forming the holding lip.

2. The automotive glass run according to claim 1, wherein the plasticizer-enriched thermoplastic elastomer layer is formed on a side of the bottom wall abutting on the door frame in addition to the holding lip.

3. The automotive glass run according to claim 1, wherein the plasticizer-enriched thermoplastic elastomer layer is continuously formed along a side of the bottom wall and the holding lip abutting the door frame.

4. The automotive glass run according to claim 1, wherein a difference between a weight fraction of the plasticizer component contained in the thermoplastic elastomer of the plasticizer-enriched thermoplastic elastomer layer and the plasticizer component contained in the thermoplastic elastomer forming the holding lip and the bottom wall is from 3% to 25%.

5. The automotive glass run according to claim 1, wherein the thermoplastic elastomer is a dynamic vulcanization thermoplastic elastomer or a styrene-based thermoplastic elastomer.

6. An automotive glass run that is attached to an inner periphery of a door frame of an automotive door and guides ascending and descending of a door glass, comprising:
    a main body having a substantially U-shaped cross section, the main body including a vehicle-exterior side wall, a vehicle-interior side wall, the main body being formed of a thermoplastic elastomer containing a plasticizer component;
    a holding lip that extends from at least one of the vehicle-exterior side wall and the vehicle-interior side wall and abuts on the door frame, the holding lip being formed of the thermoplastic elastomer of the main body; and
    a plasticizer-enriched thermoplastic elastomer layer formed on at least one side of the holding lip abutting on the door frame, the plasticizer-enriched thermoplastic elastomer layer containing a sufficiently larger amount of the plasticizer component compared to that contained in the thermoplastic elastomer of the main body for warping the holding lip toward the door frame.

7. The automotive glass run according to claim 6, wherein the plasticizer-enriched thermoplastic elastomer layer is formed on a side of the bottom wall abutting on the door frame in addition to the holding lip.

8. The automotive glass run according to claim 6, wherein the plasticizer-enriched thermoplastic elastomer layer is continuously formed along a side of the bottom wall and the holding lip abutting the door frame.

9. The automotive glass run according to claim 6, wherein a difference between a weight fraction of the plasticizer component contained in the thermoplastic elastomer of the plasticizer-enriched thermoplastic elastomer layer and the plasticizer component contained in the thermoplastic elastomer forming the holding lip and the bottom wall is from 3% to 25%.

10. The automotive glass run according to claim 6, wherein the thermoplastic elastomer is a dynamic vulcanization thermoplastic elastomer or a styrene-based thermoplastic elastomer.

* * * * *